Nov. 2, 1965    B. R. NEELY, JR    3,215,015
CONTROL COUNTER FOR EQUAL PART PRODUCT DIVISION
Filed April 3, 1962    7 Sheets-Sheet 1

FIG.1

INVENTOR.
BENJAMIN R. NEELY, JR.
BY
Russell, Chittick & Pfund
ATTORNEYS

Nov. 2, 1965   B. R. NEELY, JR   3,215,015
CONTROL COUNTER FOR EQUAL PART PRODUCT DIVISION
Filed April 3, 1962   7 Sheets-Sheet 5

FIG.4A

INVENTOR.
BENJAMIN R. NEELY, JR.
BY
Russell, Chittick & Pfund
ATTORNEYS

Nov. 2, 1965  B. R. NEELY, JR  3,215,015
CONTROL COUNTER FOR EQUAL PART PRODUCT DIVISION
Filed April 3, 1962  7 Sheets-Sheet 6

INVENTOR.
BENJAMIN R. NEELY, JR.
BY
ATTORNEYS

Nov. 2, 1965        B. R. NEELY, JR        3,215,015
CONTROL COUNTER FOR EQUAL PART PRODUCT DIVISION
Filed April 3, 1962                         7 Sheets-Sheet 7

LEGEND
PULSE ⟶
LEVEL ⟶●

INVENTOR.
BENJAMIN R. NEELY, JR.
BY
Russell, Chittick & Pfund
ATTORNEYS

United States Patent Office 3,215,015
Patented Nov. 2, 1965

3,215,015
CONTROL COUNTER FOR EQUAL PART PRODUCT DIVISION
Benjamin R. Neely, Jr., West Boylston, Mass., assignor to Morgan Construction Company, Worcester, Mass., a corporation of Massachusetts
Filed Apr. 3, 1962, Ser. No. 184,890
11 Claims. (Cl. 83—363)

This invention relates generally to counter control systems for dividing a running product in an industrial process into a plurality of pieces of approximately equal length where the product is formed from a quantity of material that is random within certain wide limits.

The invention will be described with specific relation to a rolling mill wherein a billet of steel containing only an approximately constant quantity of material is rolled into an elongated product such as wire or rod and it is desired to subdivide the total amount of finished product produced from an individual billet into a plurality of equal length pieces.

Two different control schemes will be described which are usable in the two situations where (1) the product produced from an individual billet completely passes through the rolling mill and is subdivided before the next billet enters the rolling mill; and (2) the situation where billets enter the rolling mill before the preceding billet and the product rolled therefrom has completely left the mill.

It is, accordingly the principal object of the present invention to provide arrangements for subdividing fixed quantities of material into a plurality of equal length pieces after that material has been formed into a finished product by the process.

A further object is to provide novel apparatus and control systems for achieving the foregoing object.

These and other objects of the invention will be apparent from the following detailed description taken in conjunction with the accompanying drawings wherein.

Figure 1:
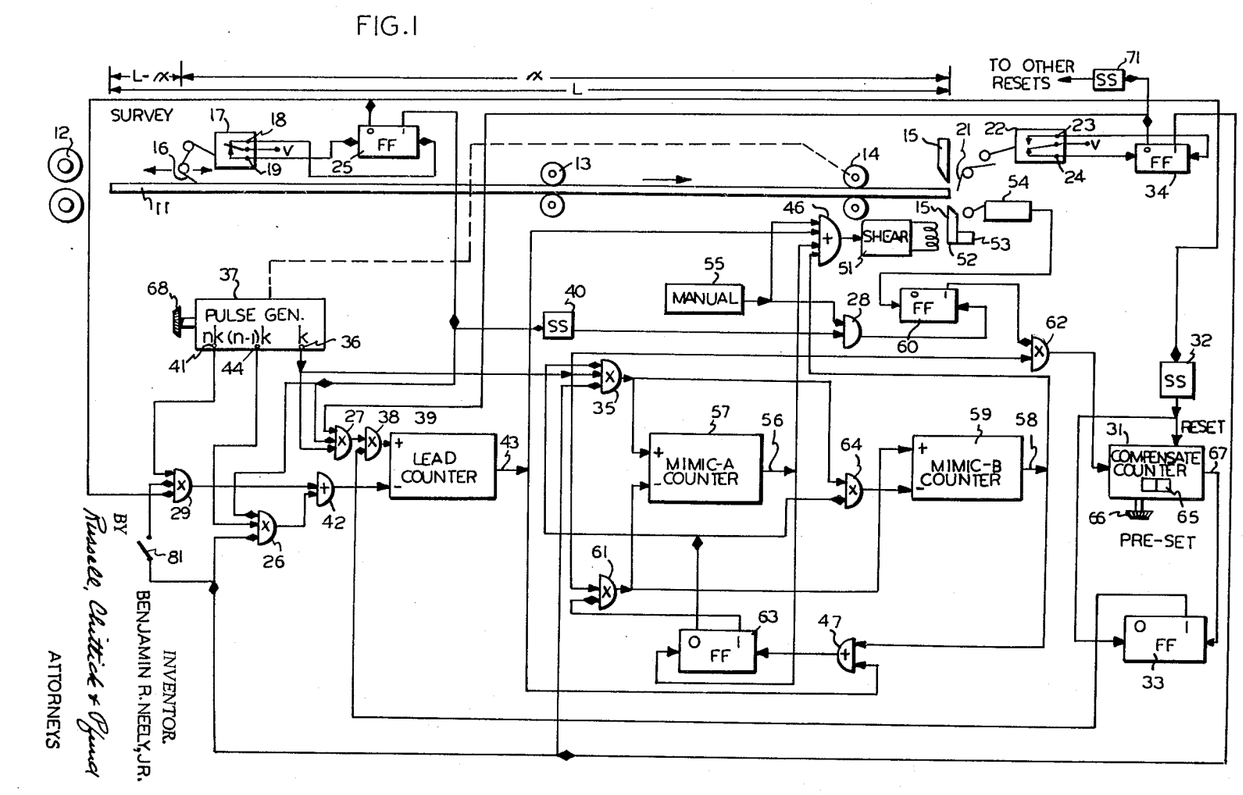
FIG. 1 is a logic diagram of a control system applied to a mill for the purpose of the invention where only one billet is in the mill at any given time.

A generalized description of the system for dividing a single billet into an equal number of parts will first be presented without reference to the specific control system of FIG. 1 to which the description applies in order to show that the system theory does, in fact, produce the desired result of equal length cuts.

This present invention applies, in general, to dividing into equal parts, a length of material produced on a continuous basis. By continuous basis, it is meant that the same volume of material per unit of time passes all points along the length of the process. The invention is intended specifically to provide a signal to permit dividing, by means of a shear, the product rolled from a billet so that equal parts may be coiled in two or more pouring or laying reels.

The problem of dividing the product from a billet into equal lengths is brought about by the use of random length (and random weight) billets from which the product is rolled. It is preferable, for some producers, to form the coiled product from a billet into coils of equal weight and size, rather than have all coils of a predetermined and fixed size and weight except the last one which would vary with billet length and weight.

Two product position detectors are required; for use with a rod or merchant mill, one of the detectors would be located in the roughing mill and must be movable and the other detector would be located at the shear and would be fixed. Depending upon the speed of the mill, the detectors could be photoelectric detectors or simply flag operated limit switches. A pulse generator connected to the finishing stand of the mill would provide the input to a total of four counters, with the counting controlled by the detectors. The counters will in turn control the cutting of the shear. For reference, the detector in the roughing mill will be referred to as the survey detector and the detector at the shear will be referred to as the shear detector. The four counters will be referred to as the lead counter, the mimic-A counter, the mimic-B counter, and the compensate counter.

Assume that a billet is to be rolled that will result in a total product length of L, and that the equivalent length of product between the two detectors is length $x$. In the present context all measurements are in terms of equivalent length, i.e. the position backward from the shear which is determined by measurements taking into account the reduction in cross-section experienced by the product as it proceeds through the mill. Assume that the finishing stand produces $k$ counts per unit length and that it is required to divide the product into $n$ lengths. It is necessary, for correct operation of this scheme, that the survey detector be located such that $x$ is less than L but greater than $L(n-1)/n$. The lead, mimic-A and mimic-B counters will be arranged to add or subtract counts to the total count, and to provide an output signal each time the total count reaches zero.

*Operation of lead counter*

Assume that the lead counter is at zero count. When the front end of the product from a billet being rolled reaches the survey detector, the lead counter shall start counting and continue to count at the rate of $k$ counts per unit length until the front end of the bar reaches the shear detector. At the instant the front end of the bar reaches the shear detector, the count on the counter will be $kx$, and the length of bar beyond the shear is zero.

When the front end of the bar reaches the shear detector, the lead counter will start subtracting counts at the rate of $(n-1)k$ counts per unit length and continue subtracting counts at this rate until the end of the bar reaches the survey detector. At the instant the end of the bar reaches the survey detector, the length of bar beyond the shear will be $(L-x)$ and the count on the lead counter will be $kx-(n-1)k(L-x)$ or $$k(x-nL+nx+L-x \text{ or } k(-nL+nx+L)$$

When the end of the bar reaches the survey detector, the lead counter will begin subtracting counts at the rate of $nk$ counts per unit length and will continue subtracting counts at this rate until the counter reaches zero, at which time the shear will be given a signal to cut. When the lead counter reaches zero, the length of bar beyond the shear will be $$(L-x)+\left(\frac{1}{nk}\right)(k)(-nL+nx+L)$$

or $$L-x-L+x+\frac{L}{n}$$

or $L/n$ which is the desired length.

Thus the lead counter can signal the shear to make the first cut when the first $n$th part of the product has passed the shear.

Upon giving the shear the signal to cut, the lead counter stops counting and remains set to zero to await the arrival at the survey detector of the product from the next billet before resuming counting.

Operation of mimic-A and mimic-B counters

At the instant that the front end of the bar reaches the shear detector, the mimic-A counter is at zero count and shall start counting at the rate of $k$ counts per unit length. At the instant the shear makes a cut (as a result of the signal from the lead counter), the count on the mimic-A counter is $$k\frac{L}{n}$$

and at this instant the counter shall start subtracting counts at the rate of $k$ counts per unit length. When the mimic-A counter reaches zero, $L/n$ length of bar will have passed the shear and the counter will provide a signal to cause the shear to make a cut.

At the instant the mimic-A counter starts counting down to make the second cut, the mimic-B counter is at zero count and shall start counting at the rate of $k$ counts per unit length. The mimic-B counter shall start subtracting counts at the rate of $k$ counts per unit length when the mimic-A counter reaches zero and second cut is made. When the mimic-B counter reaches zero it causes the shear to make the third cut. While the mimic-B counter is counting down, the mimic-A counter will again count up. When the mimic-B counter causes the shear to make the third cut (upon reaching zero), the mimic-A counter will again start counting down, causing the shear to make a cut upon reaching zero. The mimic-A and mimic-B counters alternately count up and down, causing the shear to make a cut each time either of the counters reaches zero. The counters thus alternately control length of cut until $(n-1)$ cuts are made, causing the product to be divided into $n$ parts.

Compensate counter

The operation as described above would provide accurate indications for division of the product from a billet if the delay time from the instant a counter reaches zero until the time the shear completes the cut is negligible, and if no crop is taken between the survey detector and the reels. In practice, the normal crop cut after the roughing mill could be ignored, but for high speed mills, the delay time in making a cut must be considered. The function of the compensate counter is to compensate for shear delay time. In operation, the shear would be operated through a cut cycle by hand control while the finishing stand is running at the operating speed for the product being rolled. The compensate counter would start counting at the instant the shear received a signal to cut and would count at the rate of $nk$ counts per unit of length until stopped by a limit switch contact that is actuated when the shear reaches the cut position. The count would be displayed to the operator and the operator would preset this count on the compensate counter.

Operation—All counters

In operation, detection of the front end of the bar by the survey detector would cause the compensate counter to reset to zero. Also, detecion of the front end of the bar by the survey detector causes the compensate counter to start counting at the rate of $k$ counts per unit of length until the preset count is reached (the preset is described above). The lead counter will remain at zero count until the compensate counter preset is reached. Upon reaching the compensate counter preset, the lead counter will start counting from zero count, as previously described, and initiate a shear cut. The mimic-A counter will start counting up, as previously described, but will start counting down when the lead counter reaches zero and signals the shear to cut. The mimic-B counter shall start counting up when the mimic-A counter starts counting down, then the mimic-A counter will start counting up when the mimic-B counter starts counting down, each producing a signal when the count reaches zero causing the shear to cut.

The effect of delaying the count of the lead counter may be shown mathematically as follows. Let $y=$the length of bar that will pass the shear from the instant the shear receives a signal to cut until the cut is made. By letting the compensate counter count at the rate of $nk$ counts from the instant the shear receives a signal to cut until the cut is made, the count displayed would be $nky$. By delaying the count of the lead counter by $nky$ counts, the count on the lead counter at the instant the front end of the bar reaches the shear detector is $kx-nky$. When the end of the bar reaches the survey detector, length $L-x$ has passed the shear and the lead counter has reached $$kx-nky-(n-1)k(L-x)$$

or $$k(x-ny-nL+nx+L-x)$$

or $$k(-ny-nL+nx+L)$$

When the lead counter reaches zero, the length of bar beyond the shear is $$L-x+\left(\frac{1}{n}\right)(k)(-ny-nL+nx+L)$$

or $$\frac{L}{n}-y$$

and the shear is given a signal to cut. While the shear is accelerating to make the cut, $y$ length passes the shear, thus the shear cuts when $L/n$ length passes the shear.

At the instant the front end of the bar reached the shear detector, mimic-B counter started counting up at the rate of $k$ counts per unit length and when the shear received the signal to make a cut, the count on the mimic-A counter was $$k\left(\frac{L}{n}-y\right)$$

and while counting down to zero at $k$ counts per unit of length, $$\frac{L}{n}-y$$

length passes the shear and the shear receives a signal to cut. Thus, compensation is made for shear acceleration and delay time.

System features and requirements

A read-out and preset are required only for the compensate counter. No operator settings are required for the lead, mimic-A, and mimic-B counters. The number of counts per unit of length may be any number as long as the capacity of the counters is not exceeded. Although probably of no great importance, the setting of the compensate counter will permit compensating for the amount of product cropped between the survey detector and the shear detector. To effect the compensation for the crop cut, the number of counts for the equivalent length of product cropped from the bar multiplied by $n$ should be subtracted from the compensating count preset which represents shear delay time.

The location of the tail end of the bar at the instant the front end reaches the shear detector will be a function of billet size and product size for a given mill. A necessary condition for correct operation of this system requires that (1) the tail end of the bar not pass the survey detector before the front end of the bar reaches the shear detector, and (2) not more than $n-1/n$ of the total equivalent length of bar remain to pass the survey detector when the front end of the bar reaches the shear detector. The variation in billet length and weight must not exceed an amount that will permit a single location of the survey detector for each rolling condition.

The generation of $k$, $(n-1)k$, and $nk$ pulses per unit of length may be handled electronically by generating pulses at the rate of, say, $z$ counts per unit length. Let $nk$ counts per unit length equal $z$ counts per unit length. Then, every $n$th pulse would occur at the rate of $k$ counts per unit length and the difference between $nk$ and $k$ would be a pulse rate of $(n-1)k$. Or, if the maximum number of cuts per length is relatively small, several pulse generators could be used. For rod and merchant mill, usually not more than four coils are formed from the product from a billet, and four pulse generators, used selectively would be suitable. Any such pulse generation scheme can be used and such devices are well known in the art.

Referring now to FIG. 1, a control system for dividing a product produced from a billet into equal parts will be described. The control system of FIG. 1 is useful in mills where the billet has been converted into a form in which a constant quantity of material is passing through the process at any given point and the tail end of the product from a given billet is detectable prior to the time that the head end of that billet reaches the shear which is to divide the finished product into equal parts. A further condition on the size of the billet required by the control system of FIG. 1 is that not more than $n-1/n$ portion of the total equivalent length of the product remain to pass the initial detector when the front end of the product reaches the detector located at the shear.

The diagram in FIG. 1 is a logic diagram assembled from well-known logical units for performing the desired functions. The logic diagram utilizes elements including flip-flops (FF), AND gates, OR circuits, single-shots (SS) and pulse counters capable of producing an output signal either when counting up to a preset count or when counting down upon reaching zero. The electrical characteristics which these units perform are well-known in the art and will be further described as to the functions performed herein in connection with the individual figures describing the logic elements.

In FIG. 1, a typical layout shows a product 11 in the pass line having been delivered from the last rolls 12 of roughing mill with any number of further reductions provided by rolls 13 in the finishing mill until the finished product is delivered through finishing rolls 14 from which the product passes a shear 15 which is operative to sever the product 11 into the desired lengths. It will be understood that the representation of the product 11 and the finishing mill comprising rolls 13 and 14 is highly schematic in that the various reduction stands prior to the finishing stand 14 operate at different speeds and with different cross-sectional areas of the product since at each stand some change in the cross-sectional area shape or size occurs. The total quantity of product passing any given stand is constant, however, and in terms of the present invention it is useful to consider this constant quantity in terms of its equivalent length of the finished product. Hence the mill has been drawn as though the product were a constant size from beginning to end and the length of the product obtained from a single billet is indicated as the length L. As previously indicated, this length L must be such that a survey detector 16 can be located along the pass line at a position $x$ of equivalent product length from the shear 15 such that the remainder $L-x$ of equivalent product between the survey detector 16 and the tail end of the product 11 is less than a distance equivalent to $1/n$ times the length of the product, where $n$ is the number of equal lengths into which the product is to be divided. Stated another way, the survey detector is located such that $x$ is less than L but greater than $L(n-1)/n$.

The survey detector 16 actuates a switch 17 which has a single pole, double throw contact of the break-before-make type, such that a voltage V is applied to one or the other of terminals 18, 19 when the switch is actuated in either direction. As shown in FIG. 1, the survey detector has been actuated by the presence of the product 11 and voltage is applied to output terminal 18 of the switch 17. When the product 11 is not present at the survey detector 16, the survey detector switch 17 will revert to the lower contact to apply voltage to the output terminal 19.

A second detector, known as a shear detector 21, is located to detect the product 11 as soon as it passes the shear 15. The shear detector 21 actuates a switch 22 which is similar to the switch 17 and produces an output voltage on terminal 23 whenever product has passed the shear 15 to actuate the shear detector 21 while producing a voltage output from a terminal 24 whenever product is absent beneath the shear detector 21.

The terminal 18 of the survey detector switch 17 is connected to a set input of FF 25 and the terminal 19 is applied to the reset input of FF 25. The ONE output of FF 25 is connected as an input to AND 26, AND 27 and to a SS 40 which has its output applied to OR 28. The ZERO output of FF 25 is connected to AND 29 and to a reset input of a compensate counter 31 through a SS 32, which changes the level signal from the ZERO output of FF 25 into the pulse output suitable for resetting the counter 31. This reset pulse from the SS 32 is also applied to the reset input of a FF 33.

The AND 27 is further enabled from the ZERO output of a FF 34 which has a reset input from the terminal 24 of shear switch 22 and a set input from terminal 23 of switch 22. The ONE output of FF 34 is applied as an input to AND 26 and as an input to an AND 35. When AND 27 has both enabling inputs present, it passes pulses at the rate of $k$ pulses per unit length from a terminal 36 on a pulse generator 37 which is coupled to the finishing stand 14 to generate pulses directly related to the speed at which the product 11 passes the finishing stand 14.

Pulses passed by AND 27 are applied to an AND 38 which is enabled by an input from the ONE output of FF 33. Pulses passing the AND 38 are applied to a lead counter 39 at the add input thereof to accumulate counts in the additive mode of the counter 39.

The AND 29 is connected to a terminal 41 of generator 37 to apply pulses at the rate of $nk$ counts per unit length of material 11 whenever AND 29 is enabled by the ZERO output of FF 25. Pulses passed by AND 29 are applied to an OR 42 which passes the pulses to the subtract input of the counter 39. The presence of pulses out of OR 42 thus decreases the count in the counter 39 by counting in descending order until the counter reaches zero, at which time the counter 39 produces a single pulse output at lead 43 and remains at zero count until positive upward counting is resumed by the pulses being applied from AND 38 to the additive input thereof. The logic is so arranged that only positive or negative counting will occur at any time. The counter 39 counts up for inputs to the positive terminal thereof and counts down for inputs to the negative terminal thereof and these counts occur on a mutually exclusive basis.

A second input to the negative counter terminal of the counter 39 is provided by OR 42 from AND 26 whenever enabled, with the counting pulses being derived from a terminal 44 which supplies pulses at the rate of $(n-1)k$ pulses per unit length of the material 11. Since ANDs 26 and 29 are enabled, respectively, by the ONE and ZERO outputs of the FF 25, only one or the other pulse counting rates from the terminals 41 or 44 will be applied to the subtractive input of the counter 39.

The output 43 of the lead counter 39 is applied to the inputs of two ORs 46, 47. The output of OR 47 sets a FF 63 which has its ZERO output applied to enable the AND 35. Hence FF 63 disables AND 35 upon the occurence of an output on lead 43 of the counter 39. The FF 63 is reset by the output of amimic-A counter 57.

The OR 46 controls a shear actuating circuit 51 whenever an input pulse occurs on one of the inputs of the OR 46. The shear control 51 operates a lower blade 52 of the shear which makes the cut and at the completion of the cut actuates, by means of a lug 53, a shear limit switch 54. The remaining inputs of the OR 46 for actuating the shear 51 are a manually operated input 55, an output 56 from the mimic-A counter 57, and an output 58 from a mimic-B counter 59. A pulse on any one of the four inputs to the OR 46 actuates the shear 52.

The pulses at the rate of $k$ per unit length of material 11 appearing at terminal 36 are also applied as an input to AND 35 to an AND 61 and an AND 62. The AND 61 is enabled by the ONE output of the FF 63 to apply $k$ counting pulses to the subtractive input of mimic-A counter 57 and to the additive input of mimic-B counter 59.

The output of AND 35 is applied to the additive input of mimic-A counter 57 and through an AND 64 to the subtractive input of mimic-B counter 59. The ANDs 35 and 64 are both enabled by the ZERO output of FF 64 and thus operate in conjunction with AND 61 to make the mimic-A counter count up while the mimic-B counter counts down, and vice versa. The output 56 of mimic-A counter 57 resets FF 63 and is applied as an input to the OR 46 to produce a cut. The output 58 of mimic-B counter 59 is applied through OR 47 to set FF 63 and also is applied to OR 46 to produce a cut.

The compensate counter 31 is employed to establish a delay corresponding to the time it takes for the shear blade 52 to move, after receipt of a signal by shear control 51, to its limit position where it has completed the cut and at which position lug 53 has actuated the switch 54. The actuation of limit switch 54 resets a FF 60. The compensate counter 31 counts $k$ pulses per unit length of the product 11 through AND 62 whenever the FF 60 is set. The FF 60 is set by an output from OR 28 derived from either manually operated switch 55 or the ONE output of FF 25. The count accumulated in the counter 31 is visible on dial indicator 65 and the counter 31 can be preset by means of control 66 to produce an output on lead 67 whenever the count accumulated in the counter 31 corresponds to the preset count set by means of the control 66. The output 67 is applied to set the FF 33.

The operation of the system of FIG. 1 will now be described. Assume that there is no product 11 coming through the mill and all of the FF's have been reset so that their ZERO outputs have an enabling voltage thereon and their ONE outputs do not provide an enabling voltage output. It will first be necessary to calibrate the delay time for the shear blade 52 to complete a cut. For this purpose with the mill running at normal operating speed, the manual switch 55 is actuated to set FF 60, which enables gate 62 to pass $k$ counts per unit length to the compensate counter 31. The pulse generator 37 is generating pulses at the rate corresponding to the finishing stand 14 operating at the correct speed at which it will operate when it is passing product to the shear 15. The manual switch actuation 55 passes through OR 46 to initiate a cut in control circuit 51 and the shear blade 51 starts to move. When the blade 52 has reached a limit position corresponding to the completion of a cut, the actuation of switch 54 resets FF 60 disabling AND 62 and stopping the count in the counter 31. This count appears on the dial 65 and is preset into the counter by means of the control 66. The counter 31 is reset to zero, preferably by detection of the front end of a billet at the survey detector 16, and the equipment is ready for the control of division of a billet into an equal length number of segments.

The number of segments into which the billet is to be divided is determined by means of a control 68 on the pulse generator 37 which permits the selection of the number $n$. For any given setting of $n$ the indicated relation between the pulse outputs 41, 44 and 36 holds.

Upon the emergence of a billet from the roughing mill rolls 12, the head end actuates the survey detector 16 that operates switch 17 to apply from terminal 18 a set pulse to FF 25 thereby applying enabling voltage to ANDs 26 and 27 and triggering SS 40 to apply a pulse to OR 28. The remaining input of AND 27 is enabled from the ZERO output of FF 34 and hence AND 27 passes $k$ pulses per unit length to AND 38 which is disabled due to the connection from the ONE output of FF 33. The ONE output of FF 25, through SS 40 and OR 28, sets FF 64 thereby enabling AND 62 to pass $k$ pulses per unit length to the compensate counter 31 and counts accumulate in this counter at that rate. Upon the accumulated count in the compensate counter 31 reaching the preset level established as hereinbefore described, an output appear on lead 67 which sets the FF 33 thereby enabling AND 38 and at this time $k$ pulses per unit length are applied to the additive input of lead counter 39 and the count starts to accumulate therein. This count continues until the head end of the product reaches the position of the shear 15 at which time it actuates the shear detector 21 thereby operating switch 22 to apply at terminal 23 a voltage signal to set FF 34. The ZERO output of FF 34 disables AND 27 when the FF 34 is set thereby stopping the additive count in the lead counter 39.

When FF 34 is set, the AND 26 has an enabling voltage input as does the AND 35. As postulated previously, the head end of the billet reaches the survey detector 21 before the tail end is removed from the survey detector 16 and hence FF 25 is still set thereby completing the enablement of AND 26 to pass pulses at the rate of $(n-1)k$ from terminal 44 to OR 42 and thus to the subtractive input of the lead counter 39. Since AND 27 has been disabled at the same time that AND 26 was enabled the positive count of $k$ pulses per unit length into lead counter 39 switches to a subtractive count of $(n-1)k$ counts per unit length at the same instant. This count continues until the tail end of the product 11 passes the survey detector 16 and the switch 17 reverts to the condition where contact 19 applies a reset voltage to FF 25. When FF 25 is reset the ZERO output thereof enables AND 29 and triggers SS 32 to reset the compensate counter 31 and reset FF 33 thereby removing enabling voltage from AND 38. Thus the lead counter 39 operates only when the FF 25 is set and the FF 34 is reset corresponding to the time of travel of the head end of the bar 11 from the survey detector 16 to the shear detector 21 less the interval introduced by the compensate counter 31 corresponding to the travel of the bar 11 pass the shear 15 during the interval between the application of the shear cut signal to the shear control 51 and the time it takes the shear blade 52 to move to its limit position and actuate switch 54. After the first cut, the tail of the bar 11 has left the position of the survey detector 16 and FF 25 is reset thus resetting the compensate counter 31, FF 33, and disabling AND 38 so that the lead counter 39 does not participate in the division of the remainder of the bar.

The remainder of the bar is divided by the up and down alternate counting action of the mimic-A counter 57 and the mimic-B counter 59. The mimic-A counter 57 starts counting up when the lead counter 59 starts counting down. The down count in the lead counter 39 will determine the interval of the up count in the mimic-A counter 57 and, therefore, the shear delay interval set by the compensate counter 31 in the counting operation of lead counter 39 is transferred into the mimic-A counter 57 and is preserved as the count is transferred back and forth by the action of FF 63 between the mimic counters 57 and 59 while the bar is divided into an equal number of parts.

When the tail end of the bar 11 passes the shear detector 21, the switch 22 reverts to the position where a voltage appears on terminal 24 to reset FF 34 thereby partially enabling AND 27 while disabling AND 26 to interrupt counts into the subtractive input of lead counter 39 in preparation for receipt of the next bar. Resetting FF 34 also disables AND 35 which in conjunction with the general FF reset from SS 71 prevents mimic counters 57 and 59 from counting during the initial survey counting sequence previously described which will be repeated when the head end of the next bar passes the survey detector 16.

The reset output of FF 34 may be employed to operate a SS 71 which supplies a reset pulse to all of the FF's in the system except the resets supplied by SS 32. Thus, all FF's and counters will be reset to the correct initial conditions prior to the appearance of the head end of the next bar at the survey detector 16. If desired, the reset output of SS 71 could be employed to reset the compensate counter 31 and the FF 33 also, since in the operation of the system of FIG. 1 no survey count can occur in counter 39 between the passage of the tail end of the bar from the survey detector 16 which corresponds to the reset of FF 25 and the time that the tail end of that bar passes the shear detector 21 corresponding to the reset of FF 34.

The following general description relates to control of a mill where billets are closely spaced and two may be present within the controlled system at the same time.

For the control scheme which will now be described, a movable photoelectric survey detector, a shear detector and four counters are required. To obtain an indication of the presence of the bar in two locations where it is not feasible to locate the movable photoelectric detector, load relays are required for Stands 1 and 2. If desired, one load relay could selectively serve both stands.

The movable photoelectric detector or the load relay for Stand 1 or Stand 2 will be referred to as the survey detector, and the photoelectric detector at the shear will be referred to as the shear detector. The counters will be referred to as the lead-A counter, the lead-B counter, the mimic counter, and the compensate counter.

The lead-A, lead-B and mimic counters shall have capacity to 9999 counts and shall, selectively, add or subtract counts from the total. Each of these counters shall be arranged to provide an output signal to cause the shear to make a cut each time the total count on the counter is reduced to reach zero. Presets are not required for these counters. Display for these counters is not required.

The compensate counter shall have capacity to 99 counts and will be required to count only in an adding direction. Dials are required for presetting a two digit count with an output produced when the accumulated count reaches the preset. A display for the counter is required.

All counters will count pulses produced by the pulse generator coupled to the finishing stand.

In order for this scheme to successfully control shear operation, the speed of the mill stands must be set and held such that the same volume of steel per unit of time passes all points between the two detectors. This would be evidenced by loops on the repeaters that hold a constant size and neither grow nor shrink.

*General operation—Lead counter*

For an explanation of the basic idea behind the scheme, assume that shear delay time is negligible and that the shear, upon receiving a signal, cuts instantaneously. Assume that the survey detector is located such that when the front end of the product from a billet is detected at the shear detector, the end of the bar has not passed the survey detector and not more than $1/n$ of the product from the billet remains to pass the survey detector, where $n$ represents the number of parts into which the product from the billet will be divided; $n$ may have integral values such as of 2, 3, or 4.

Assume that the lead-A counter is at zero count. When the front end of the product from the billet reaches the survey detector, the lead-A counter shall start counting and continue to count at the rate of 1 count per foot until the front end of the bar reaches the shear detector. At the instant the front end of the bar reaches the shear detector, the count on the lead-A counter will be $x$ counts, and the length of a bar beyond the shear is zero. The value of $x$ will depend upon the entering billet size, the final product size, and the location of the survey detector. The value of $x$ represents the amount of steel between the two detectors in feet (approximately) of finished product.

When the front end of the bar reaches the shear detector, the mimic counter starts counting up and the lead-A counter will start subtracting counts at the rate of $n-1$ counts per foot and continue subtracting counts at this rate until the tail end of the bar reaches the survey detector. At the instant the end of the bar reaches the survey detector, the length of bar beyond the shear will be $L-x$, where L equals the total length of bar which will be produced from the billet, and the count on the counter will be $x-(n-1)(L-x)$, or $(x-nL+nx+L-x)$ or $$(-nL+nx+L)$$

When the tail end of the bar reaches the survey detector, the lead-A counter will begin subtracting counts at the rate of $n$ counts per unit length and will continue subtracting counts at this rate until the counter reaches zero, at which time the shear will be given a signal to cut. When the counter reaches zero, the length of bar beyond the shear will be $$(L-x)+\left(\frac{1}{n}\right)(-nL+nx+L)$$

or $$L-x-L+x+\frac{L}{n}$$

or $L/n$ which is the desired length. Thus the lead-A counter can signal the shear to make the first cut when the first $n$th part of the product has passed the shear.

Since the spacing between billets may be extremely short, the lead-A and lead-B counters will operate with alternate billets. While the lead-A counter is counting down to cause the first cut of the product from a billet, the lead-B counter could have started counting for the product from the next billet.

*Compensate counter*

The operation as described above would provide accurate indications for division of the product from a billet if the delay time from the instant a counter reaches zero until the time the shear completes the cut is negligible. The function of the compensate counter is to compensate for actual shear delay time.

To arrive at the amount of compensation required, the shear would be caused to operate through a cut cycle by hand control while the finishing stand and shear are running at the operating speed for the product being rolled. The compensate counter would start counting at the instant the shear received a signal to cut and would count at the rate of $n$ counts per foot until stopped by a limit switch contact that closes when the shear is in its cutting position. The count would be displayed to the operator and would be set by the operation on the preset dials for the compensate counter.

In operation, detection of the front end of the bar by the survey detector would cause the compensate counter which has previously been reset to zero to start counting at the rate of $n$ counts per unit of length until the preset count is reached. The lead counter (either lead-A or lead-B) will remain at zero until the compensate counter preset is reached. Upon reaching the compensate counter preset, the lead counter will start counting from zero, count up, then down, as previously described, and initiate a shear cut.

The result of delaying the count of the lead counter may be shown mathematically as follows. Let $y$ equal the length of bar that will pass the shear from the instant the shear receives a signal to cut until the cut is made. By letting the compensate counter count at the rate of $n$ counts per foot from the instant the shear receives a signal to cut until the cut is made, the count displayed would be $ny$.

Presetting the compensate counter to $ny$ counts, and delaying the lead counter by $ny$ counts will cause the count on the counter at the instant the bar reaches the shear detector be $x-ny$. Length $L-x$ will have passed the shear by the time the tail end of the bar reaches the survey detector, and the count on the lead counter will be $(x-ny)-(n-1)(L-x)$, or $(x-ny-nL+nx+L-x)$, or $(-ny-nL+nx+L)$. The counter will start counting down and when it reaches zero, the length of bar beyond the shear will be $$L-x+\frac{1}{n}(-ny-nL+nx+L)$$

or $$\left(L-x-y-L+x+\frac{L}{n}\right)$$

or $$\frac{L}{n}-y$$

and the shear will be given a signal to cut. During the shear delay time, $y$ feet of bar will pass the shear and the length of cut will be $L/n$ which is the desired length.

The operation of the compensate counter and lead counter as described above will control the operation of the shear for the first cut when dividing the product into 2, 3, or 4 parts.

When dividing into 2 parts, only the compensate and lead counters will be used, and the mimic counter will not be required.

*Mimic counter—Dividing into three parts*

When dividing the product into 3 parts, the mimic counter will be used to initiate the second cut. The mimic counter is at zero when the front end of the bar reaches the shear detector. Detection of the front end of the bar by the shear detector shall cause the mimic counter to start counting up and to continue counting at the rate of 3 counts per foot until the lead counter (which functions as previously described) provides an output signal to cause the first cut. This signal shall cause the mimic counter to start counting down, without missing a count, at the rate of 3 counts per foot until the count reaches zero, which shall initiate the second shear cut. The mimic counter will cause the second cut length to be the same as the first cut length.

*Counter operation—Dividing into four parts*

Unfortunately, for several rolling schedules, the survey detector must be located such that at the instant the front end of the bar reaches the shear detector, more than ¼ of the product from a billet may remain to pass the survey detector. The survey detector may not be located on the entry side of Stand 1 because the speed of the product at this point is independent of mill speed. The use of a load relay on Stand 1 in these situations provides the first usable indication of the presence of the front end of the product from a billet. When dividing the product into four lengths, for these few rolling schedules, the lead counter may reach zero and cause the shear to make the first cut before the end of the bar reaches the first stand. The first length cut would therefore be short. With the distance between Stand 1 and the shear equal to $x$ ft. of product, the shear will make the first cut when ¼ $(L-z)$ ft. of the bar has passed the shear, where $$z=L-\tfrac{4}{3}x$$

If the mimic counter is made to count up at the rate of 3 counts per foot, then count down at the rate of 2 counts per foot as long as the bar is present at Stand 1, and count down at the rate of 3 counts per foot after the end of the bar leaves Stand 1, the last three lengths of bar will be equal to ¼$(L-z)+\tfrac{1}{3}z$ ft. each if L is greater than $\tfrac{4}{3}x$. The location of the survey detector is most critical when cutting the product from a billet into 4 parts; therefore, to minimize any error which may result because of improper location of the survey detector and to take care of the error that results for the several schedules for which there is no ideal location of the survey detector, counting of the mimic counter up at the rate of 3 counts per foot and down at the rate of 2 counts (when required) and 3 counts per foot thereafter will minimize this error.

If the survey detector can be located such that $\tfrac{4}{3}x$ is equal to or greater than L, then the mimic counter will count up at the rate of 3 counts per foot and count down only at the rate of 3 counts per foot and each length will equal L/4.

The results of the change in counting rate may be shown mathematically as follows. At the instant the front end reaches the shear detector, the mimic counter starts counting up at the rate of 3 counts per foot and at the instant the lead counter signals the shear to make the first cut, the count on the mimic counter is $$3\left(\frac{L-z}{4}-y\right)$$

If at this instant the end of the bar has not passed the survey detector, the mimic counter will start counting down and continue counting down at the rate of 2 counts per foot until the end of the bar passes the survey detector (if the end of the bar has passed the survey detector, the counting rate will be 3 counts per foot). At the instant the end of the bar passes the survey detector, the count on the mimic counter will be $$3\left(\frac{L-z}{4}-y\right)-2z$$

and $z$ feet of product will have passed the shear. The mimic counter will then start counting down and continue counting down at the rate of 3 counts per foot until the count reaches zero, and the shear will be given a signal to cut. At the instant the shear is given a signal to cut, the length of product beyond the shear is $$z+\frac{1}{3}\left[(3)\left(\frac{L-z}{4}-y\right)-2z\right]$$

or $$\left(z+\frac{L-z}{4}-y-\frac{2}{3}z\right)$$

or $$\left(\frac{L}{4}+\frac{1}{12}z-y\right)$$

and while the shear is accelerating $y$ feet of product passes the shear, and the length cut will be $$\frac{L}{4}+\frac{1}{12}z$$

or $$\frac{1}{4}(L-z)+\frac{1}{3}z$$

The third cut, when dividing into 4 parts, will be initiated by the lead counter. At the instant the mimic counter started counting down to make the second cut, the lead counter will start counting up at the rate of 3 counts per foot. At the instant the mimic counter signals the shear to make a cut, the lead counter shall start counting down and continue counting down at the rate of 3 counts per foot until the count reaches zero, and the shear will be given a signal to cut.

Figure 2A:
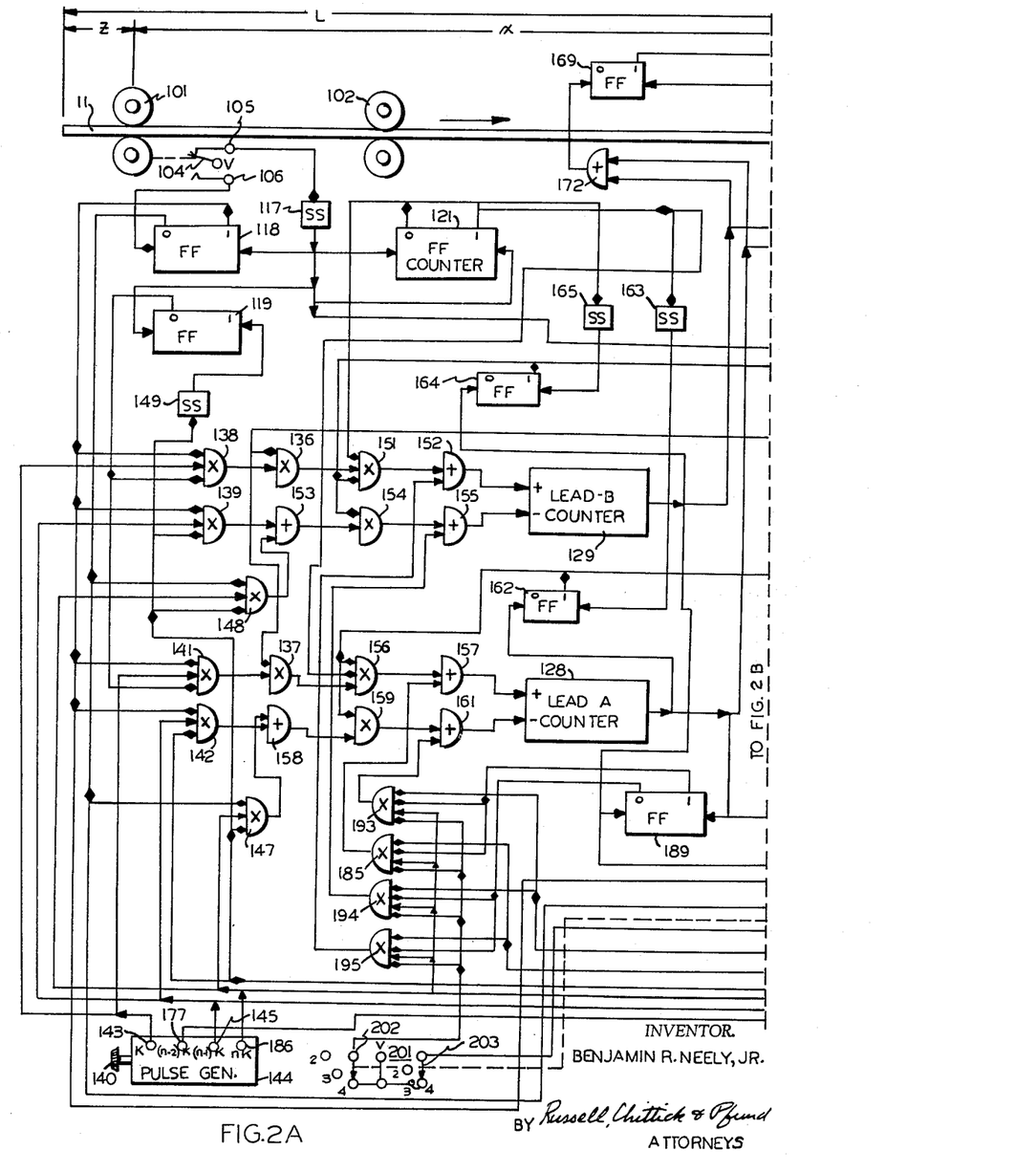
FIGS. 2a and 2b, assembled as indicated, are a logic diagram of a control system applied to a mill in which control functions can be performed in relation to two billets in the mill simultaneously.
Figure 2B:
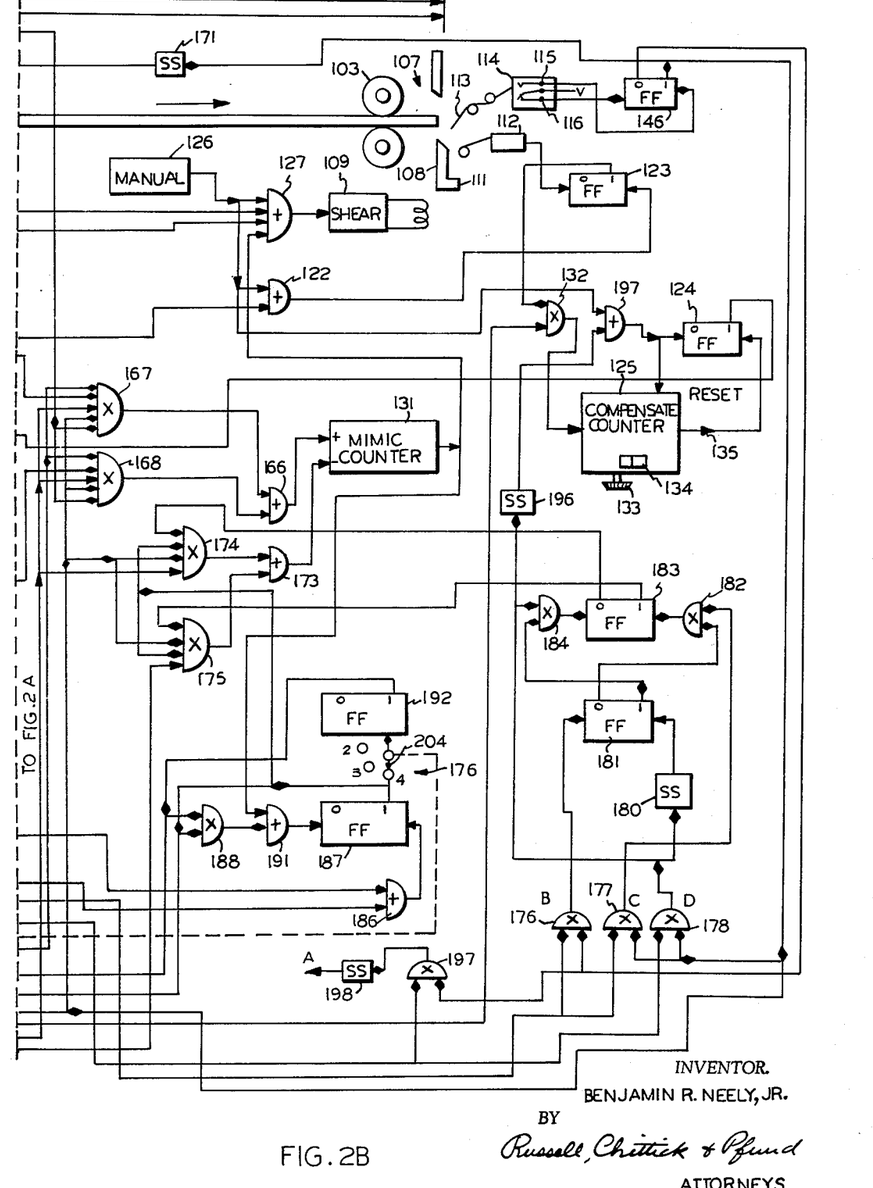

Referring to FIG. 2, a control system for a rolling mill will be described which has the capability of accommodating product running through the mill where the tail end of the product formed from one billet is followed by the head end of the product from the next billet with a spacing which is less than the pass length of the product through the mill. Thus, the control circuit must be operating for dividing the preceding billet while the following billet is already entering and passing into the survey stage of the mill.

Only the portions of the mill corresponding to Stand 1, designated 101, and Stand 2, designated 102, together with a finishing stand 103 are indicated in FIG. 2. The first and second stands, 101 and 102, are each provided with a load relay for use as the survey detector. As explained in connection with FIG. 4, any subsequent stand can be used as the location for the survey detector or an intermedite position depending on the relation of the total equivalent length of the product being rolled to the length of the mill.

As indicated in FIG. 2, the first stand 101 is equipped with a load relay 104 for applying operating voltage to contacts 105 or 106 corresponding, respectively, to the presence or absence of product in the roll stand 101. The switch function provided by the relay 104 may also be located at stand 102 or subsequent stands or to a movable survey detector similar to the survey detector 16 of FIG. 1, as determined by the rolling schedule discussed under survey detector location.

At the finishing stand 103, a shear 107 is provided having a movable blade 108 driven by a shear control 109 each time the shear control 109 is energized by an input pulse. The movable blade 108 has a projecting lug 111 for actuating a limit swtich 112 which produces an output voltage pulse when the blade 108 is moved to the position where the cut is completed.

At the location of the shear 107 a shear detector 113 is arranged to detect the presence of product at the shear location by the actuation of a switch 114 which produces actuating voltage on terminals 115 and 116 depending, respectively, on the presence or absence of product at the location of shear detector 113.

The terminal 105 of switch 104 is connected to the input of SS 117 which produces a single output pulse upon the application of voltage to terminal 105. This output pulse from SS 117 is applied to set a FF 118, to reset a FF 119, and to operate FF counter 121 by application of the pulse to both the set and reset inputs thereof. The FF counter 121 operates upon the occurrence of simultaneous inputs to the set and reset sides to change state; thus, if the counter 121 is set, the application of simultaneous set and reset pulses will reset the counter 121. Conversely, if the counter 121 is reset, the application of simultaneous input pulses will set the counter. The output pulse of SS 117 is also applied through OR 122 to set a shear delay FF 123. A pulse output also is obtained from OR 122 upon the actuation of manual control 126 which, when operated, also passes a pulse through an OR 127 to initiate a cut by applying the pulse to shear control 109.

In addition to manually initiated shear cuts, the OR 127 is energized from the output of a lead-A counter 128, the output of a lead-B counter 129, and the output of a mimic counter 131, so that a cut may be initiated upon the occurrence of an output pulse from any of the units 126, 128, 129 or 131.

The shear delay FF 123, when set, enables an AND 132 to pass pulses at the rate of a multiple of $n$ counts per unit length of product to a compensate counter 125. Thus, if the multiple of $n$ is unity and the number of pieces into which the product is to be subdivided is four, the AND 132 will pass four pulses per unit length of product to the input of the compensate counter 125. The counter 125 is arranged with a preset selector 133 and indicator 134 upon which a preset count can be set for the purpose of delaying an output on line 135 until the input counts have accumulated a number equal to the preset. The output on line 135 is applied to set a FF 124 and the ONE output of FF 124 is applied to AND's 136 and 137 to enable these AND's only after the delay introduced by counting to the preset on the compensate counter 125 has been introduced.

The FF 118 has its ONE output applied to enable AND's 138, 139, 141 and 142. The AND's 138 and 141 have applied thereto the basic counting rate of $k$ pulses per unit length obtained from terminal 143 of a pulse generator 144. Where the lowest multiple of $k$ is unity, the pulses of the terminal 143 occur at the rate of 1 pulse per unit length of product 11. The AND's 139 and 142 have applied thereto pulses at the rate of $(n-1)k$ pulses per unit length from terminal 145 of the generator 144.

The remaining enabling input of AND's 138 and 141 is derived from the ZERO side of the FF 119 which is always reset upon the occurrence of an output pulse from SS 117. The remaining enabling input of AND's 139 and 142 is derived from the ONE side of the FF 146 which is set by the voltage on terminal 115 whenever the shear detector 113 detects product at the shear location. The FF 146 is reset by voltage at terminal 116 indicating an absence of product at the shear detector 113.

The ONE output of the FF 146 is also applied as an enabling output to AND's 147, 148, and to trigger a SS 149. The SS 149 sets the FF 119 upon the occurrence of an output from the ONE side of FF 146 thereby disabling AND's 138 and 141 when the product reaches the shear detector 113.

The output of AND 138 is applied to the AND 136, the output of which is applied to an AND 151, the output of which is applied to an OR 152 which supplies input pulse to the additive input of the lead-B counter 129.

The output of AND 139 is applied to an OR 153 which supplies an input to an AND 154, the output of which is coupled through an OR 155 to the subtract input of lead-B counter 129.

The output of AND 141 is applied to the AND 137 which supplies an input to an AND 156, the output of which passes through an OR 157 to the add input of lead-A counter 128.

The outputs of AND's 142 and 147 pass through an OR 158 to supply an input to an AND 159, the output of which passes through an OR 161 to the subtract input of the lead-A counter 128.

The AND's 156 and 159 are enabled by a ONE output of a FF 162, which is set by the output of a SS 163 which is triggered to produce an output every time the counter 121 produces a ONE output. The FF 162 is reset by the output of the lead-A counter 128 which occurs when the subtractive input thereto reduces the accumulated counts therein to zero. The AND 156 is further enabled by the ONE output of the counter 121 directly.

The AND's 151 and 154 are enabled by the ONE ontput of a FF 164 which is set by the output of a SS 165 which is triggered by the ZERO output of FF 121 to produce a pulse output every time the FF counter 121 is reset. The FF 164 is reset by the output of the lead-B counter 129 which output occurs when the subtractive input thereto reduces the accumulated count to zero. The AND 151 is further enabled by the ZERO output of counter 121 directly.

For cutting the billet into three or four pieces, additional control circuitry is required associated with the mimic counter 131. For this purpose, the additive input to the mimic counter 131 is supplied through an OR 166 which has inputs from two AND's 167 and 168. The AND 167 is enabled by the ONE output of FF 164, the ONE output of FF 146, and the ONE output of a FF 169. The FF 169 is set by the occurrence of the ZERO output of FF counter 121 and is reset by pulses from an OR 172 which produces a pulse output whenever the lead-A or lead-B counters 128, 129 produce an output. When enabled, the AND 167 passes $(n-1)k$ pulses from terminal 145 through the OR 166 to the additive input of the mimic counter 131.

The AND 168 is enabled by the ONE output of FF 162, the ONE output of FF 146, and the ONE output of a FF 169 which is set coincident with the time FF 146 is set and reset by the output of either lead-A or lead-B counters 128 or 129 applied through OR 172.

The final enabling input to both AND's 167 and 168 is obtained from the voltage V at terminals 3 and 4 of a switch 203 which is used to select $n$, the number of parts into which the product is to be divided.

The subtractive input of the counter 131 is supplied from an OR 173 which derives its inputs from two AND's, 174 and 175. Both of the AND's 174 and 175 are enabled by the ONE output of FF 146 and the ONE output of the first stage of a two-stage counter, 176. The counter 176 is used to control the second and third cuts when cutting the billet into four parts, as will be hereinafter described. When enabled, the AND 174 passes pulses at the rate of $(n-1)k$ from the terminal 145 of the generator 144 to the subtractive input of the mimic counter 131. When AND 175 is enabled, it passes pulses at the rate of $(n-2)k$ from a terminal 177 of generator 144 to the subtractive input of the mimic counter 131.

The final enabling input to the AND's 174 and 175 which determines whether the subtractive count is at the rate of $(n-1)k$ or $(n-2)k$ counts per unit length must be determined by the condition of the end of the current billet having past the survey detector at the first stand 101 or as not having past this point.

There exist five states of product position in the mill relative to the control system of the present invention. State A corresponds to no product in the mill in the region of interest at which times the survey detector 104 and the shear detector 113 will not be actuated and the corresponding electrical output V from terminals 106 and 116, respectively, will be obtained. Condition B corresponds to the survey detector 104 being actuated with output potential V available at terminal 105 and with shear detector 113 not actuated due to the presence of product thereunder. Condition C corresponds to both the survey detector 104 and the shear detector 113 being actuated with control potentials V appearing at both terminals 105 and 115. Condition D corresponds to the passage of the tail end of the billet from under the survey detector so that the switch 104 is not actuated and the control potential V appears at terminal 106 while the survey detector 113 is actuated and a control potential V continues to appear at terminal 115. The fifth state is somewhat ambiguous and results from the presence of the head end of the next billet to actuate the survey detector 104 while the product from the preceding billet is still actuating the shear detector 113 and hence from the condition of switches 104 and 113 this state is indistinguishable from state C, above defined. From the past history of product passing through a mill, however, it is possible to distinguish this fifth state, which will be called state E, as being the condition when both switches 104 and 113 are actuated prior to switch 113 being de-actuated by the passage of the tail end of the billet from the shear position.

Conditions B, C and D are obtained from three AND's, 176, 177 and 178. The AND 176 is energized by the connection to the ONE side of FF 118 and the ZERO side of FF 146. The AND 177 is energized by connection to the ONE side of FF 118 and to the ONE side of FF 146. The AND 178 is energized by connection to the ZERO side of FF 118 and the ONE side of FF 146. The output of AND 176 is applied to reset a FF 181. The output of AND 177 is applied to an AND 182 which is also supplied from the ZERO side of FF 181 to produce an output which sets a FF 183. The output of AND 178 is applied to trigger a SS 180 to set FF 181 and directly to an AND 184 which combines with the output from the ONE side of FF 181 to apply a reset to FF 183. The ONE output of FF 183 is applied as the final enabling input of AND 175 while the ZERO side of FF 183 is applied as the final enabling input to AND 174. As will be further described, this combination of AND's 176, 177, 178, FF 181 and FF 183, control the AND's 174 and 175 so that the mimic counter 131 subtracts at the rate of $n-2$ counts per unit length while condition C prevails, and reverts to subtracting at the rate of $n-1$ counts per unit lengths during condition D. The absence of condition B after condition D prevents the resetting of FF 181 which prevents the subtractive condition from assuming the $n-2$ rate through AND 175 during condition E (which produces an output C at AND 177) when the head of the following billet actuates survey switch 104 prior to the de-actuation of the shear switch 113 by the passage of the tail of the preceding billet past the shear position.

The occurrence of the first cut, resulting from the output of the lead-A counter 128, stops the additive count in the mimic counter 131 and initiates the subtractive count due to the enabling output to AND's 174, 175 from the ONE side of the first stage of counter 176, as previously described. At the end of the subtractive count, when the mimic counter 131 reaches zero, an output occurs which initiates a second cut. Between the first and second cut it is necessary for the lead-A counter to again begin accumulating counts for controlling the third and final cut. Since the lead-A counter 128 was reduced to zero for making the first count, it is again ready to accumulate counts at its additive input through OR 157, and these counts are applied through an AND 185 which is supplied $n$ counts per unit length from terminal 186. AND 185 is enabled by the "1" count appearing on the ONE side of the first stage of counter 176 as a result of the cut signal output derived from lead-A counter 128 through an OR 186. The output of the OR 186 sets stage 187 which is the first stage of the two-stage counter 176. The ONE side of FF 187 applies an input to an AND 188 and one of the inputs to AND 185. The remaining enabling input to AND 185 is derived from the ONE side of the FF 189 which is set by the cut pulse output of lead-A counter 128. FF 189 is reset by the cut pulse output of lead-A counter 128. FF 189 is reset by the cut pulse output of lead-B counter 129 and thus is capable of a memory function to assure that the accumulation of counts for the third cut is in the same lead counter which accumulated the counts for the first cut, since the alternate lead counter may have already started accumulating counts from the survey of the next on-coming billet. The output of AND 185 applies additive counts to the lead-A counter 128 until the cut output of the mimic counter 131 applies another count through an OR 191 to reset the FF 187 thereby removing the enabling voltage on AND 185. The reversion of FF 187 from set to reset applies a count to the second stage FF 192 in normal binary counter fashion so that FF 192 is now set and its ONE side enables an AND 193 which passes counts through OR 161 to the subtractive input of lead-A counter 128. AND 193 is also enabled by the ONE side of FF 189 so that the correct lead counter is both added and subtracted rather than the alternate lead counter. The ONE side of FF 192 in counter 176 is also connected as an input to AND 188 so that upon the occurrence of the third cut which, through OR 186, sets FF 187 of the counter 176 both ONE sides of FF's 187 and 192 are simultaneously set satisfying AND 188 to apply a reset pulse through OR 191 to FF 187. This reset adds another count into stage 192 and resets that stage so that the counter is at 00 condition at the end of the third cut.

For a billet which is initially counted on the lead-B counter 129, the operation for the second and third cuts is the same as for a billet counted on the lead-A counter as provided by a pair of AND's 194 and 195. The AND 195 supplies the additive input of lead-B counter 129 through OR 152 and the AND 194 supplies the subtractive input of lead-B counter 129 through OR 155. Inputs to both of the AND's 194 and 195 are derived from the ZERO side of FF 189 thereby insuring their enablement only after a cut output from the lead-B counter 129 has occurred. The remaining inputs to AND's 185, 193, 194 and 195 are from an $n=4$ switch 202 and the counting pulses at $n$ counts per unit length from terminal 186. The cut pulses from lead-B counter 129 are also applied to the OR 186 so that the counting action of the counter 176 is similar to that for the lead-A counter.

In order to provide the proper operation of the compensate counter 125 to operate only for the first cut from each billet, a SS 196 is connected to the D output of AND 178 to provide a brief pulse whenever a D condition is initiated. The D condition corresponds to the removal of the billet from under the survey detector switch 104 and hence the occurrence of a pulse from SS 196 at this time can be applied through an OR 197 to the reset input of the compensate counter 125 and the reset of FF 124. In this manner the FF 124 will be set by the output 135 of the compensate counter 125 to introduce the desired delay before the first cut, but will not introduce any delay in subsequent cuts in the same billet since the FF 124 will remain set and the additive input AND's 136 and 137 will be enabled. After the tail of the particular billet passes the survey detector 104, however, a D output of AND 178 will produce a pulse out of SS 196 to reset the compensate counter 125 and the FF 124, thereby disabling the additive input AND's 136 and 137 so that the delay produced by the compensate counter 125 will be introduced upon the arrival of the next billet.

Since counting may be taking place in alternate lead counters and in the mimic counter for closely spaced successive billets, the system reset is derived from condition A for which neither survey switch 104 or shear switch 113 is actuated. This corresponds to the ZERO side of FF's 118 and 146 producing output by the FFs' being reset and this condition is recognized by an AND 197 which produces a reset pulse from a SS 198 upon the occurrence of A condition which corresponds to no product in the significant portion of the mill.

The operation of the circuit of FIG. 2 will now be described. Assume initially that there is no product in the mill, that all FF's have been reset, and all counters reset to zero. The first step, if the delay time of the shear is to be compensated, will be to calibrate the compensate counter 125. This is performed by bringing the mill up to operating speed so that the generator 144 is producing pulses properly related to the speed of the finishing stand 103 which is operating at the desired speed for the mill. The manual cut switch 126 is actuated to apply a pulse through OR 127 to the shear control 109, the same pulse being applied to reset the compensate counter 125 and FF 124 while also passing through OR 122 to set FF 123, thereby enabling AND 132 to pass pulses at the rate of $nk$ pulses per unit length of product length which would run through the finishing stand 103 at its operating speed to the input to the compensate counter 125. When the blade 108 of the shear has reached its limit position after a cut, the lug 111 will operate the switch 112 to reset the FF 123. When the switch 112 resets the FF 123, the AND 132 is disabled and the count on indicator dials 134 represents the delay in terms of counts in the compensate counter which is introduced by the travel time of the shear blade 108. This count is then set into the compensate counter by means of the manual control 133 so that an output will appear on lead 135 only after a delay of that many counts from the starting of an accumulation of counts in the compensate counter 125 after it has been reset.

The next step is to set $n$, the number of equal parts into which the billet is to be divided. This is determined by the setting of the control 140 which selects the number $n$ corresponding to the number of parts. For the system here disclosed it can be 2, 3 or 4, with the billet divided into the corresponding number of pieces. The same setting is established for switches 202, 203 and 204.

Assume that the control 140 has been set for $n=2$ which will divide the billet into 2 equal pieces. When the head of the billet arrives at the number 1 stand, 101, the load relay switch 104 is actuated, producing a voltage on terminal 105 which actuates SS 117 to set FF 118, set FF counter 121, reset FF 119, and through OR 122 set FF 123. With FF 123 set, AND 132 is enabled so that the compensate counter accumulates counts until the preset on dial 134 is reached, at which time an output on lead 135 sets FF 124, thereby enabling AND's 136 and 137. With FF counter 121 set, the AND 156 is enabled due to the pulse from SS 163 which sets FF 162 and hence the pulse train through serial AND's 137 and 156 is enabled for pulses received from AND 141. AND 141 is enabled by the ONE output of FF 118 and the ZERO output of FF 119, both of which are enabling at this moment so the lead-A counter 128 starts accumulating counts applied to its additive input.

When the head end of the product 11 reaches the shear detector 113, the switch 114 is actuated to produce a voltage on terminal 115 to set the FF 146 thereby enabling the AND's 142 or 147 depending upon the state of FF 118, the ZERO and ONE sides of which are connected for enabling AND's 147 and 142, respectively. Thus, if the tail end of the product 11 has not passed the first stand 101, the FF 118 will still be set and AND 142 will be enabled while AND 147 will not be enabled, therefore, the count will proceed at $(n-1)k$ counts per unit length through the subtractive path composed of OR 158, AND 159, and OR 161. AND 159 remains enabled by the set FF 162 until a cut output from the lead-A counter 128 occurs. Thus, as soon as the lead-A counter counts back down to zero, an output will occur resetting FF 162 and disabling further counting in the lead-A counter 128. If during the subtractive count the tail of billet passes the stand 101, the switch 104 reverts to the condition where voltage appears at terminal 106, thereby resetting FF 118 to disable AND 142 and enable AND 147. The subtractive count thereafter proceeds at the rate of $nk$ counts per unit length to produce the desired cut when the lead-A counter 128 reaches zero. Since it has been stated as a condition of operation that the portion of the billet not yet past the survey detector stand 101 when the head end reaches the shear detector 113 shall not be greater than one-fourth the length of the finished product, the switch 104 will always be returned to its position on terminal 106 during the countdown in lead-A counter 128. Thus the countdown will initially occur at $(n-1)k$ counts per unit length and switch to subtraction at the rate of $nk$ counts per unit length when the tail of the billet passes the survey detector stand 101. As previously shown, this action divides the billet into two equal parts and the action repeats continuously and on an automatic basis alternately in the lead-A counter 128 and lead-B counter 129. The reset pulse A from SS 198 establishes the initial conditions whenever no product is in the mill.

For those cases where the next on-coming billet arrives at the survey detector 101 before the last half of the product passes the shear detector 113 the counter 121 will be reset to have its ZERO output providing enabling voltage to AND 151 so that the additive count in lead-B counter 129 can start while the previous billet is still running through the downstream portion of the mill. With counter 121 being reset, the ZERO output thereof produces a pulse from SS 165 to set FF 164 to complete the enablement of AND 151 while the occurrence of D condition from AND 178 has reset the compensate counter 125 and FF 124 to introduce the shear delay for the first cut on the billet counted by lead counter 129. The remaining operation is entirely similar to that described for the up and down count in lead-A counter 128 with the circuits associated with the mimic counter 131 playing no part in the operation when the billet is divided only into two parts. The selection of the lead-A or lead-B counter is determined solely by the state of FF counter 121 and alternates between the two lead counters.

For a billet to be divided into three parts, the control 140 is set to $n=3$ and the switches 202, 203 and 204 are moved to contact 3. The additive count in lead-A counter occurs as previously described for $n=2$. With the selector switch 201 set for $n=3$, the AND's 193, 194, 185 and 195 do not have their common enabling input from switch arm 202 and hence no third-cut accumulation in the lead counters occurs. The switch arm 203 in position 3 enables the AND's 167 and 168 to permit the mimic counter 131 to operate and control the second cut for each billet. The switch 201 being set at position 3 also disconnects the coupling between the ONE output of FF 187 and the counter input of FF 192 in the two-stage counter 176 thereby avoiding the problem of resetting the second stage 192. In particular, the occurrence of an output of a lead counter sets FF 187 of counter 176 to enable the subtractive AND's 174 and 175 and the cut output pulse of the mimic counter 131, after it has counted down to zero, resets FF 187 so that the second cut, when dividing the product into three equal parts, leaves the FF 187 in a reset condition and ready to respond to the next lead counter output as the next billet passes through the mill.

For dividing a product into four parts, the control 140 is set to $n=4$ and the switches 202, 203 and 204 are set on the position of 4, to enable the common inputs from switch arm 202 of all of the AND's 193, 194, 185 and 195 and also to enable the AND's 167 and 168 by means of the voltage applied to switch arm 203. The switch arm 204 makes the coupling connection between the ONE output of FF 187 and the counter input of FF 192.

When dividing the billet into four parts, two conditions can prevail, as previously described; (1) where the remainder of the product not yet passed through the first stand 101 where the survey detector 104 is located is less than one-fourth the total length of the product produced from the billet; and (2) where this remainder is greater than one-fourth the product length. Case (1) will be treated first.

The first cut is performed by an additive accumulation at $k$ counts per unit length to the lead-A counter 128 and the subtraction thereof at the rate of $(n-1)k$ counts per unit length until the end of the billet passes the survey stand 101 after which the subtractive count is completed at the rate of $nk$ counts per unit length, just as previously described. When the output of lead-A counter 128 produces the first cut, the FF 189 is set as is the FF 187 thereby enabling AND 185 for the additive accumulation of counts in the lead-A counter 128 during the subtractive count in the mimic counter 131. The occurrence of the first cut also enables the subtractive AND's 174 and 175 from the ONE output of FF 187 but since for the condition (1), above, with the remainder not greater than one-quarter of the product length condition D has already occurred. Thus, the ZERO output of FF 183 will have enabled AND 174, whereas the ONE output of FF 183 is not available to enable AND 175. Hence, for condition (1) of product length, the mimic counter 131 counts up and down at the same rate of $(n-1)k$ counts per unit length. Upon reaching zero the mimic counter 131 produces an output which produces a second cut and the cut-pulse is also applied through the OR 191 to reset FF 187, the counter arrangement being such that this reset action applies the carry count to the FF 192 so that it is now set. The reset FF 187 disables AND 185 while the ONE output of FF 192 now enables the AND 193 (in combination with the ONE output of FF 189 and the voltage from switch arm 202) so that the subtractive input to lead-A counter 128 is energized through OR 161 to subtract at the rate $nk$ the count which had been accumulated therein during the subtractive count in the mimic counter 131. Upon the completion of this subtractive count to the point where the lead-A counter 128 is reduced to zero, another cut output will appear at its output which is also applied to OR 186 to set FF 187.

The simultaneous outputs on the ONE's of FF's 187 and 192 of the counter 176 combine in the AND 188 to reset the FF 187 which action applies a count to FF 192 thereby resetting FF 192 so that the two-stage counter is in the "00" condition. Hence the counter 176 is ready for the processing of the next billet.

For the condition where the remainder not yet past the first stand 101 is greater than one-fourth the total product length, operation proceeds as above-described except that when the first cut occurs due to an output from lead-A counter 128 the condition C exists so that FF 183 is set, thereby enabling subtractive AND 175 and disabling AND 174. Accordingly, the subtractive count in the mimic counter 131 proceeds at the rate of $(n-2)k$ counts per unit length from the terminal 177 of the generator 144 through AND 175 until the moment the end of the billet passes the survey stand 101. The survey detector switch 104 detects this passage as condition D which rests the FF 183. When the FF 183 is in reset condition, the remainder of the subtractive count in mimic counter 131 proceeds through AND 174 at a rate of $(n-1)k$ counts per unit length due to the interchange of the enabled condition of AND's 174 and 175 to that just described. The subtractive count in the mimic counter 131 thus proceeds to zero producing the second cut and advancing the counter 176 to control the third cut through the second accumulation in the lead-A counter 128, as previously described, for a dvision-by-four of the product 11.

Where the billets follow one another through the mill with relatively short spacing therebetween, it is necessary for the lead-A and lead-B counters to operate in alternation. Thus, where the tail end of one billet has passed the stand 101 but is still actuating the shear detector 131, the condition prevails that the subtractive inputs through AND's 148 and 147 must be enabled until the occurrence of the first cut; thereafter, the head end of the next billet may appear at the stand 101 at which time the additive channel through AND's 138 and 151 will be active since the counter 121 has now been reset due to the detection of the head end of the second billet and FF 164 has been set by the SS 165. The lead-B counter 129 may, therefore, start accumulating a positive count. The process now proceeds, after disposition of the previous billet, to survey and subdivide the currently traveling billet. The counter 121 has been able to keep track of the fact that this is the second billet and enabled the corresponding circuits for the lead-B counter 129. When the lead-B counter 129, at the end of its subtractive count, produces a cut output signal, it resets the FF 189 so that the ensuing additive count will be directed to the lead-B counter through the AND 195 and the following subtractive count will be directed to lead-B counter 129 through the AND 194 due to the enabling output from the ZERO side of FF 189.

The up count in the mimic counter 131 must not be repeated during the down count in either of the lead counters which produces the final or third cut signal. For this purpose the ONE side of FF 146 produces an output pulse from SS 171 whenever the FF 146 is set, due to the appearance of the head end of a billet at the survey detector 113. The pulse output of SS 171 is applied to the FF 169 to set the FF with the ONE output thereof being applied as an enabling input to AND's 167 and 168. The outputs from lead-A counter 128 and the lead-B counter 129 are both applied to the OR 172, the output of which is applied to reset the FF 169 thereby providing the FF 169 with an operating condition which makes it set from the time the head end of the billet reaches the survey detector 113 until the time one of the lead counters produces a cut signal output. From reference to FIG. 3 it will be seen that this is the interval during which the additive count is accumulated in the mimic counter 131 and hence FF 169 establishes this as the enabled interval for the AND's 167 and 168. Due to the travel time in the mill the first cut will always be made before the head end of the next billet reaches the survey detector 113 and hence there is no need to distinguish, as to FF 169, which of the lead counters is operating and which is going to supply the cut signal to reset FF 169.

Figure 3:
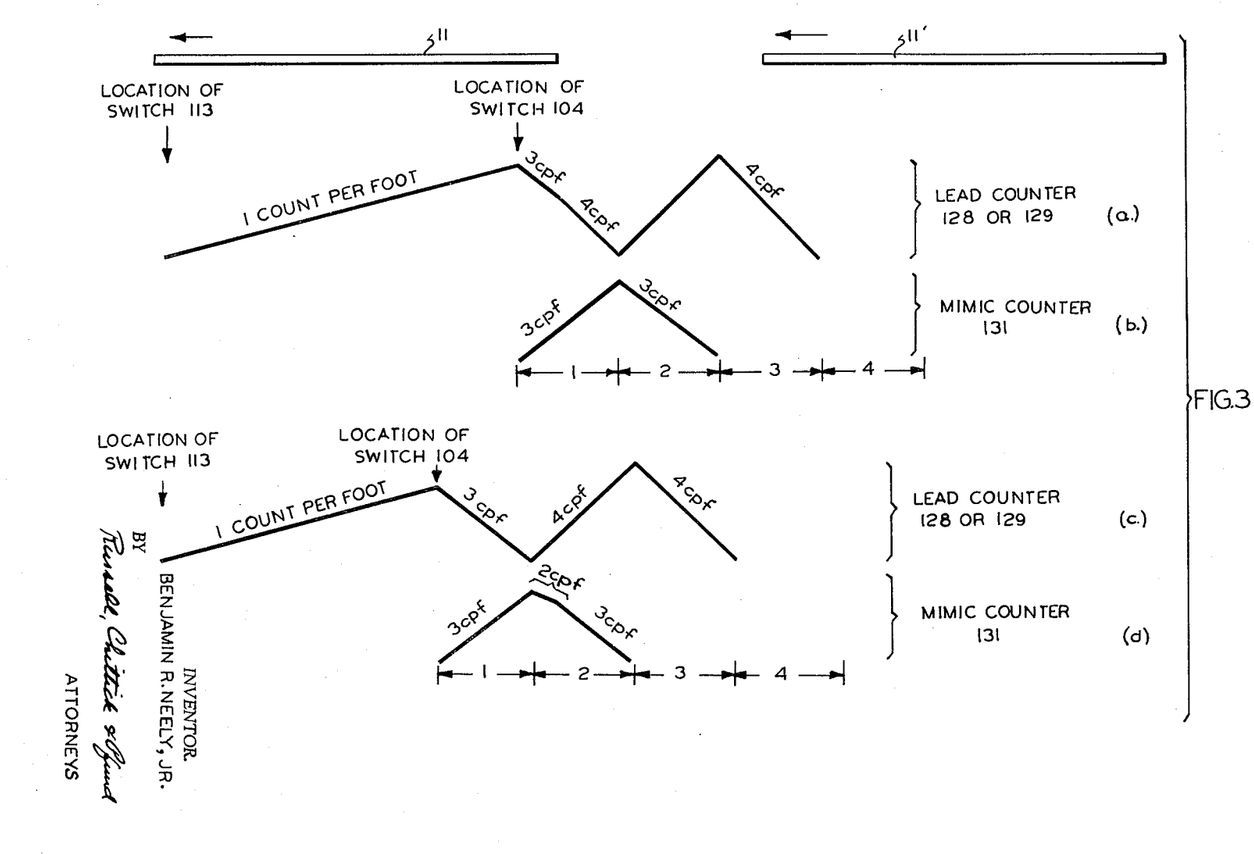
FIG. 3 is a counting diagram useful in describing two modes of operation of the apparatus of FIG. 2.

FIG. 3 is a representation of the counting sequence for two different modes of operation. The sequence represented in (a) and (b) corresponds to the situation where the tail of the product 11 passes the location of switch 104 at the survey detector before the lead counter 128 or 129, whichever is surveying that particular billet, has reduced its count to zero. For this situation the lead counter is reduced first at the rate of $(n-1)k$ counts per unit length and at the instant the tail of the billet passes switch 104 the reduction count changes to the rate of $nk$ counts per unit length. The mimic counter 131 counts up and down at a constant rate for these conditions and the lead counter resumes its up and down count at a constant rate after the first cut if the billet is to be divided into four or more equal pieces.

In FIGS. 3c and 3d, the counting mode for the situation where the lead counter is reduced to zero counts before the tail end of the bar passes the switch location 104 is indicated. For this situation, the count in the lead counter is reduced to zero at which time the mimic counter of line (d) starts a subtractive count at the rate of $(n-2)k$ counts per unit length. When the end of the billet passes the switch 104, this reduction is changed to $(n-1)k$ counts per unit length. The lead counter counts up and down at a constant count rate after the first cut, as before.

The counting sequences given in FIG. 3 are for dividing a billet into four parts. An analogous action will be readily apparent for dividing the billet into less than four parts. The action depicted is not affected by the survey of the next on-coming billet 11' since the alternate lead counter 128 or 129 which is not involved in the division of the current billet 11 is available for surveying the billet 11'. Since no action other than survey is required for the subsequent billet 11' until its head end reaches the shear detector switch 113 it is apparent that the tail end of the billet 11 will be well clear of the control system prior to the time it will be necessary for the remaining portion of the control system to revert to operate with the length surveyed by the alternate lead counter which has surveyed the billet 11'.

Figure 4A:
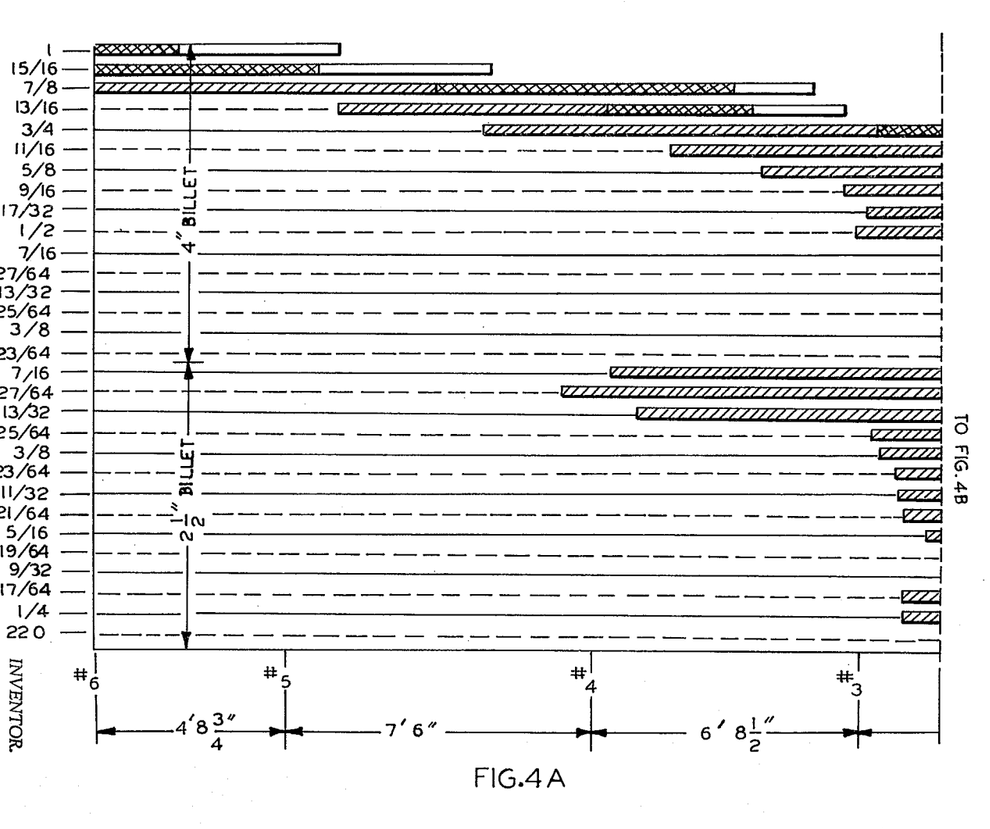
FIGS. 4a and 4b, assembled as indicated, represent the range of locations of the survey detector of the invention in a particular mill for the various sizes of product which can be rolled by the mill and is illustrative of the considerations involved in selecting the location for the survey detector.
Figure 4B:
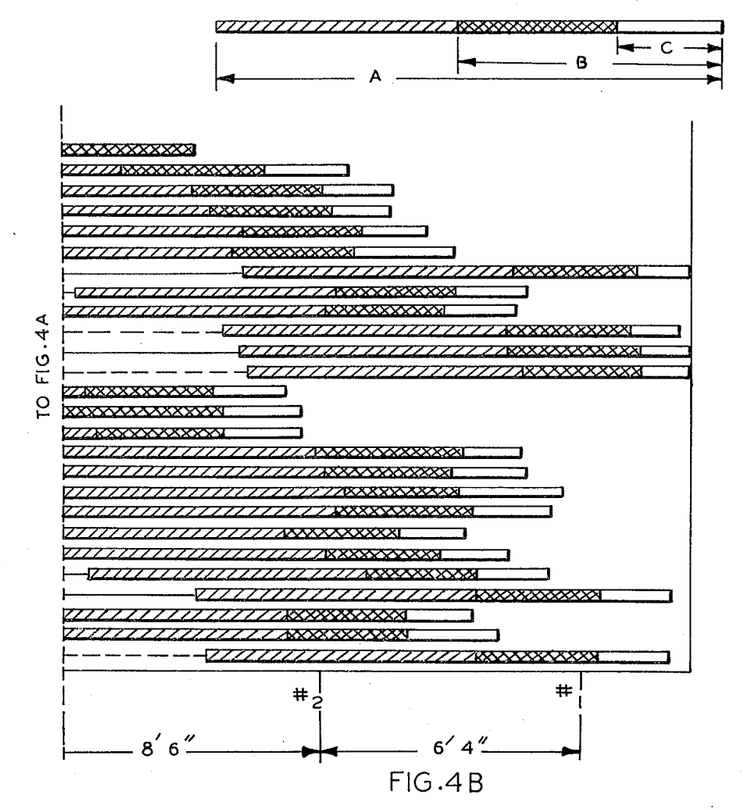

FIG. 4 shows a typical rolling mill installation in relation to the product rolled from various size billets. For a given size billet and a given finished product this particular mill permits the location of the survey detector anywhere within the region R for $n=2$, anywhere within the region S for $n=3$, and it must be confined within the region T for $n=4$. The mode of operation depicted in FIGS. 3c and d is necessitated by the region T being to the right of the number 1 stand in FIG. 4, for example, in producing 0.220 bar shown on the bottom line of the FIG. 4. A number of other similar situations appear for this particular mill layout and this particular billet and product schedule. Where the regions R, S and T are to the left of the first stand, the movable photoelectric detector can be positioned at an appropriate point to act as the survey detector except in those cases where it cannot be physically placed close enough to the Stand #2 to be correctly positioned. In this instance, the load relay of the Stand #2 will be employed as the survey detector switch.

Figure 5:
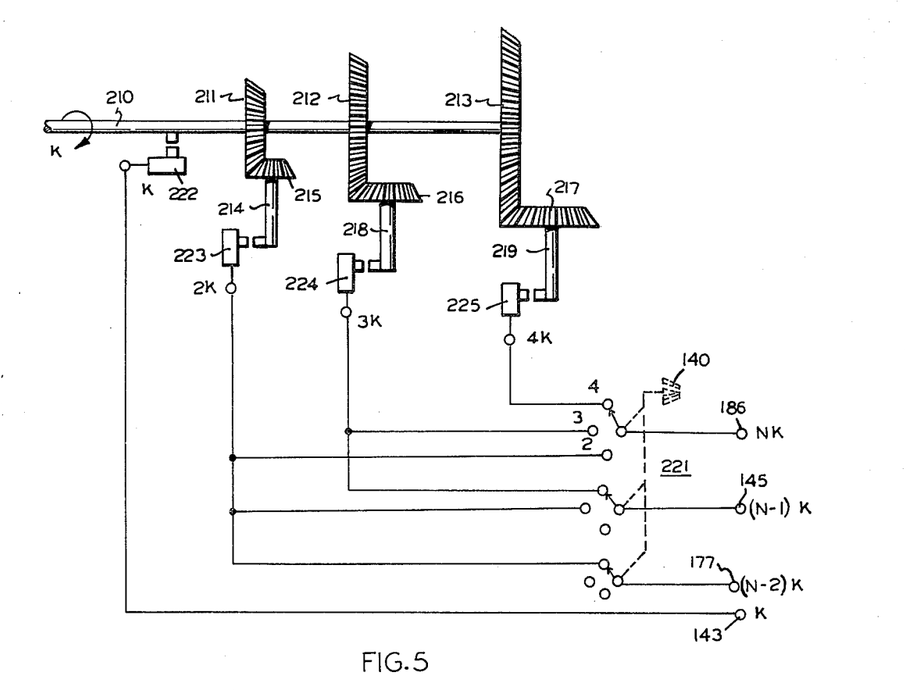
FIG. 5 is a gear train pulse generator for producing related pulses per unit length of product in a rolling mill.

Referring now to FIG. 5, a simple mechanical form of pulse generator will be described. The particular pulse generator shown is capable of producing one, two, three and four pulses per revolution of the input shaft. Accordingly, by driving the input shaft at $k$ revolutions per unit length, any desired counting speed can be employed. The actual relation between $k$ and a unit of length is not material as long as it is constant and hence the device is not required to operate with respect to any standard units of length but can be operated with respect to the operating speed of the mill. An input shaft 210 is driven at $k$ revolutions per unit length of equivalent product passing through the mill. The shaft 210 has fixed thereon a series of gears 211, 212 and 213 which engage respective gears 215, 216 and 217 to drive shafts 214, 218 and 219 at the speed of $nk$ revolutions per unit length where $n$ corresponds to the ratio between the engaged pairs of gears. As indicated, this ratio is 4:1, 3:1 and 2:1 corresponding to integer values of $n=4, 3, 2$.

Electrical signals corresponding to $k$, $(n-2)k$, $(n-1)k$ and $nk$ pulses per unit length are obtained from the terminals 143, 177, 145, and 186, respectively, for $n=2, 3$ or 4. For $n=2$ only $k$ and $nk$ pulses are supplied. For $n=3$ no $(n-2)k$ pulses are required. These pulse rates are selected by the control 140 which operates the gauged three-pole, three-position switch 221 which is shown set for $n=4$. The pulse signals are derived from cam actuated switches 222, 223, 224, and 225 which produce one pulse for each revolution of the cam shaft by which each respective switch is actuated.

While the mechanical arrangement of FIG. 5 is satisfactory for relatively slow pulse rates, it will be appreciated that equivalent electronic pulse generators can be employed where higher counting rates or more flexibility of control are required. In either form of pulse generator, suitable synchronization must be obtained so that the pulses occur in precise relation to the amount of material moving past the finishing stand 103 which is the basic timing element for the production of the finished product.

Figure 6:
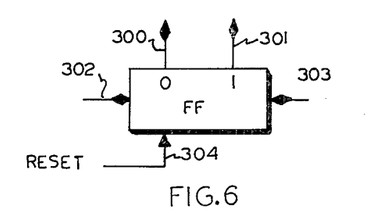
FIG. 6 is a logical representation of a flip-flop (FF)

FIG. 6 is a representation of a FF circuit as commonly used in the digital computer and control art. A FF has two states which reverse the voltage appearing at two outputs 300 and 301. The two states may be defined as "reset" and "set." These states may be achieved by two inputs 302 and 303 and once the FF is in a given state it remains there until changed by an input to the side opposite that which produced the last change of state. Thus, when the FF is reset by a signal on input 302, the ZERO output 300 produces an enabling voltage while the ONE output 301 does not produce an enabling voltage. When the FF is set by a signal on input 303, it produces an enabling voltage on the ONE output 301 and does not produce an enabling voltage on the ZERO output 300. The FFs all have an auxiliary input 304 which resets the FF for establishing initial conditions independent of the control connections to the operating reset input 302.

A FF can act as a one-stage counter by having the same signal applied to both inputs 302 and 303. For this condition the FF changes state for all input signals by means of internal connections which make the signal effective to produce a change of state irrespective of the presence of the same signal on the input appearing on both inputs 302 and 303.

Two flip-flops such as shown in FIG. 6 can be connected as a two-stage counter by connecting the ONE output of the first stage to supply both inputs of the second stage. The ordinary binary counting sequence for the two stages is thus, 00, 01, 10, and 11. This counting sequence is obtained by connections between the counting stages which advance the higher order stage only when the lower order stage ONE output is that which occurs when the FF changes from set to reset.

Figure 7:
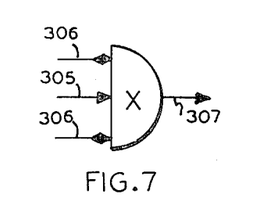
FIG. 7 is a logic representation of an AND circuit.

FIG. 7 is a representation of an AND circuit which has a pulse input 305 and a plurality of enabling inputs 306. This circuit produces pulse outputs on lead 307 which correspond to the pulse inputs on lead 305 only if all of the enabling inputs 306 have enabling voltage applied thereto.

Figure 8:
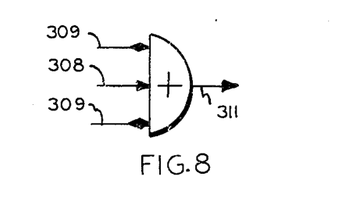
FIG. 8 is a logical representation of an OR circuit.

FIG. 8 shows an OR circuit having a pulse input 308 and a voltage level input 309. The circuit produces an output level or pulse on lead 311 corresponding to the signal on either of leads 308 or 309.

Figure 9:
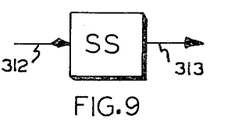
FIG. 9 is a logical representation of a single-shot (SS).

FIG. 9 is a representation of a single-shot (SS) which has applied an input level at 312 and is triggered to produce a brief duration pulse at its output 313 coincident in time with the leading edge of the level change on input 312. The SS is not arranged to produce a pulse output when the level change 312 reverts from an enabling level to a disabling level. Hence the circuit is triggered by the application of a level change representing change from a disabled to an enabled level and provides a brief pulse capable of resetting flip-flops or producing other control functions. This circuit may also be employed where triggering of a number of circuits is required in order to prevent loading the level voltage source which supplies the signal on lead 312.

A simplification in the control sequence of the invention is possible in installations where the entire billet has passed the survey detector before the head end of that billet reaches the shear detector. Under such conditions the control system of FIG. 1 would be modified by the closure of a switch 81 to apply the ONE output of FF 34 as an enabling input to AND 29. For this system in operation the billet is surveyed by accumulating an additive count in the lead counter 39 which corresponds to the interval the survey switch is actuated. During the interval from the time the tail end of the billet leaves the survey detector 16 until the head end reaches the shear detector 21 nothing happens since neither of the additive nor subtractive inputs to the counter 39 is enabled. When the shear detector 21 is actuated by the head end of the billet, the AND 29 is enabled and the counting sequence in the lead and mimic counters occurs at the rate of $nk$ pulses per unit length to divide the billet into $n$ equal parts.

While particular embodiments of the invention have been described, it will be readily understood that many modifications and departures from the particular disclosed systems may be made without going beyond the scope of the present invention. Accordingly, the herein disclosed systems are to be considered as illustrative and the invention to be limited only by the scope of the appended claims.

I claim:

1. Apparatus for controlling the subdivision of a running product into equal lengths where the product is produced from discrete billets of predetermined size range comprising means for surveying the approximate length of product to be produced from an individual billet, means for surveying the remainder length which in addition to said approximate length constitutes the whole length of product produced from said billet, means for measuring off said equal lengths by counting at a first rate for the running interval required for passage of said remainder length and at a second rate for the additional interval required for the passage of a length of product which added to said remainder length equals one of said equal lengths, both said first and second counting rates having a fixed relation to the number of said subdivisions, and means responsive to the total of said first and second counting rate accumulations for severing said product into said equal lengths.

2. Apparatus according to claim 1 in which said means responsive to said total accumulation includes a counter with means for accumulating counts at a predetermined rate during said total accumulation, means for reducing counts in said counter to zero at said predetermined rate, and means for making a second cut on said running product after the first cut which corresponds to the running length of said product while reducing said counts to zero.

3. Apparatus according to claim 2 including means for counting up during the interval of reducing counts in said counter and counting down at the same rate after said second cut, and means responsive to said counting down producing a net total of zero for making a third cut on said product.

4. Apparatus according to claim 3 and including means for alternating the up and down counts in said counter and said means for counting with said means for making a cut operating when either net total reaches zero for producing a plurality greater than three of equal length pieces from said billet.

5. Apparatus for controlling the subdivision of a running product into equal lengths where the product is produced from separate discrete quantities of material comprising means for counting at a predetermined rate during the running of product from one of said quantities to survey the length of product to be obtained from said one quantity, separating means operable to separate said product into individual lengths, means for counting after said survey against the total accumulated during said survey with a relation determined by the number of said equal lengths into which said product is to be divided, means responsive to said counting after said survey for operating said separating means to separate a first one of said equal lengths from said quantity, and means responsive to the counting interval of said last named means for operating said separating means when the number of said equal lengths is greater than two.

6. Apparatus for controlling the subdivision of a running product into equal lengths where the product is produced from discrete billets of predetermined size range comprising means for surveying the length of product to be produced from one of said discrete billets, means for accumulating and storing a quantity representing the survey length of product to be produced from said billet, means for recycling said quantity from storage at a rate related by the number of said lengths to the rate at which said quantity was accumulated, means for initiating recycling when said product reaches the position in the flow path at which separation of said lengths will occur, and means responsive to the completion of each recycling of said quantity for separating one of said lengths from said one billet.

7. Apparatus according to claim 6 and including means for introducing an alternate rate for the portion of the first recycle of said quantity during which the survey of of the remainder of said billet occurs.

8. Apparatus according to claim 7 including means responsive to the continuation of said survey until after the first of said lengths have been separated for introducing an alternate rate into the second recycle of said quantity to subdivide the remainder of said billet into equal lengths approximately equal to said first length.

9. Apparatus for controlling the subdivision of a running product into equal lengths where the product is produced from discrete billets of predetermined size range comprising length survey and storage means for accumulating data representative of the length of product to be obtained from a billet and storing said data, means for recycling data from length survey storage at a rate determined by the number of said equal lengths, means responsive to recycling said data for separating said lengths from said billet, and buffer storage means operative for surveying the length of a subsequent billet independent of the spacing between billets.

10. Apparatus according to claim 9 in which said length survey storage means and said buffer storage means are each lead counters operative to count at a predetermined rate during the survey of alternate billets, and said means for recycling data includes a third counter operative to count at a rate determined by the number of said equal lengths the data count in either of said lead counters for establishing the time for separating said equal lengths.

11. Apparatus according to claim 10 and including means for recycling data from said third counter back to the respective one of said lead counters from which survey storage data were derived when said billet is to be divided into more than three equal lengths.

No references cited.

ANDREW R. JUHASZ, *Primary Examiner.*

WILLIAM W. DYER, JR., *Examiner.*